United States Patent Office 2,892,671
Patented June 30, 1959

2,892,671
COLORING PROCESS

Frederick Richard Alsberg, Ian Durham Rattee, and William Elliot Stephen, all of Blackley, Manchester, England, assignors to Imperial Chemical Industries Limited, London, England, a corporation of Great Britain No Drawing. Application May 5, 1958
Serial No. 732,820

Claims priority, application Great Britain
November 29, 1954

27 Claims. (Cl. 8—41)

This invention lies in the art of coloring textile materials. More particularly, this invention relates to a new and novel process for coloring cellulose textile materials such as cotton, mercerized cotton, rayon, and other regenerated cellulose materials. As will be seen from the description hereinafter, this invention has application to both dyeing and printing processes and is employed in conjunction with the use of particular dyestuff materials which are caused to react with the above-mentioned textile materials. As will be evident from the following description of the invention, these dyestuffs are characterized as azo dyestuffs having a —C(Halogen)=N— group and an ionogenic solubilizing group.

This application is a continuation-in-part of application, Serial No. 549,181, now abandoned.

Prior art techniques for dyeing or printing textile materials with dyestuffs involving a reaction with a —C(Halogen)=N— group have exhibited numerous disadvantages and required complicated procedures which have been commercially unsatisfactory. The dyed material has also been unsatisfactory in its color stability and resistance to washing, etc.

Thus, British Patent No. 342,167 describes a treatment of alkali cellulose with a compound such as cyanuric chloride to obtain a derivative which, while immunized to the normal direct cotton dyestuffs and dyeing techniques, has a strong affinity for basic and insoluble acetate silk dyestuffs.

U.S. Patent No. 1,886,480 further teaches a process for dyeing cellulosic derivatives of the same type employed in said British patent which also contains a reactive halogen atom. These materials are dyed with a compound containing, in addition to its chromophoric group, an active hydrogen atom, for instance, amino dyestuffs. It is also possible to form an intermediate cellulose derivative which can then be diazotized and coupled with another compound, or directly coupled with a diazo compound.

Invariably, the above procedures require a separate and preliminary treatment of cellulose with alkali to form alkali cellulose prior to the introduction of any dyestuff-yielding material. Furthermore, the treatment of this already-formed alkali cellulose with the dyestuff, or dyestuff-yielding reagent, is invariably conducted in an organic solvent solution. The necessity of performing separate and distinct steps in carrying out a reaction has economic and technical disadvantages, and it is well known to be generally desirable to eliminate as many steps in a process as possible. Equally well, it is readily appreciated that a technique requiring an organic solvent is also economically undesirable. Not only are organic solvents expensive, but they are also of a hazardous nature, and the employment of such materials on an industrial scale means that simultaneously there will need to be employed special reaction vessels and techniques to assure safety of the workers and the plant. On the other hand, if the organic solution of the dyestuff-yielding agent used in U.S. 1,886,480 is replaced by an aqueous solution of a water-soluble dyestuff containing the halogeno-s-triazine group, little or no dyeing takes place.

It is, therefore, an object of this invention to overcome disadvantages found in the prior art.

One object of this invention is to provide a useful process for coloring the textile materials, such as cotton, mercerized cotton, rayon and other regenerated cellulose materials, which is carried out wholly in an aqueous medium.

More particularly, it is an object of this invention to provide an aqueous process for coloring textile materials with an azo dyestuff having an ionogenic solubilizing group, and an amino group carrying as N-substituent a 1:3:5-triazine radical having a carbon-halogen grouping and where the dyestuff is applied directly to the above-noted textile materials without preliminary treatment to form an alkali cellulose compound.

It is a further object of this invention to provide an aqueous process for dyeing textile materials which comprises impregnating said materials with an aqueous solution of an azo dyestuff having an ionogenic solubilizing group and an amino group carrying as N-substituent a 1:3:5-triazine radical having a carbon-halogen grouping and thereafter subjecting the impregnated material to the action of an acid-binding agent.

Another object of this invention is to provide a process for printing textiles with a printing paste containing an azo dyestuff as defined above and thereafter subjecting the textile material to the action of an acid-binding agent.

Other objects of this invention will be apparent to one skilled in the art from the description following hereinafter.

The above described objects of the invention are achieved, broadly, by treating a textile material with a class of azo dyestuffs, defined hereinafter, in aqueous medium, and then with an aqueous solution or suspension of an acid-binding agent. The process is adapted to both dyeing and printing techniques. The textile material is either impregnated or printed, as the case might be, treated with the acid-binding agent, and then, in general, exposed to the action of elevated temperatures and dried.

Another object of this invention is to provide a process for printing textiles with a printing paste containing an azo dyestuff as defined above and also containing a salt of a weak inorganic acid.

As a result of these procedures, there is obtained a colored textile material having highly desirable properties of fastness, abrasion resistance, washability, durability, etc., and, in particular, a high degree of fastness to wet processes, for example, to washing and boiling with a sodium carbonate solution, which makes it seem likely that the dyestuff has become chemically linked to the textile material. It is most surprising that reaction should take place under the operative conditions of the new colouration process, since it appears from the literature that alkali cellulose is only formed when cellulose is treated with concentrated aqueous solutions of caustic alkalis of at least 13.5% by weight, whilst the process of the present invention yields valuable colourations from solutions of noncaustic alkalis and also from solutions of caustic alkalis having as little as 0.01% by weight of the alkali.

In the practice of this invention, the dyestuffs which may be employed may be generally represented as those having the structural formula:

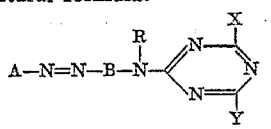

In this formula, A may represent, for example, an alpha- or beta-naphthalene or a benzenoid radical, having additional ring substituents which are ionogenic solubilizing groups, as for instance, hydroxyl, sulfonic acid, and carboxylic acid. Other groups may also be present, such as alkyl, alkoxy, aryloxy, nitro or halogen. A may also represent a heterocyclic radical such as a thiazole, benzthiazole, pyrazolone or hydroxyquinoline radical. A may also represent a polycyclic benzenoid ring system such as a diphenyl, stilbene, diphenylamine, or diphenylether radical, wherein each of the benzene rings therein may again have an ionogenic substituent thereon of the character indicated above and, as before, additional substituents may be present such as alkyl, aryl, alkoxy, aryloxy, nitro or halogen, or a heterocyclic ring may be present in place of one or more of the carbocyclic rings as in, for example, the 4-(6'-methyl-2'-benzthiazolyl)-phenyl radical. A second N-s-triazinyl radical may also be present on A.

B represents an aryl or heterocyclic group of the same types of ring systems as noted above for A. Thus, for instance, B may represent a coupled radical derived from substituted toluenes, cresidines, or H-acid, 2-amino-5-naphthol-7-sulfonic acids, 1-phenyl-5-methyl-pyrazolone, acetoacetanilide and similar radicals or may represent the radical from a diazo component derived, for example, from a monotriazinyl-phenylene diamine, -diaminostilbene, -benzidine, and similar radicals. As is apparent from the above-mentioned specific radicals, this aromatic nucleus, bonded to the azo group and the cyanuryl-substituted amino group, may be itself substituted with ionogenic solubilizing groups of the type mentioned hereinbefore as well as with additional characteristic aromatic substituents such as alkyl, aryl, alkoxy, aryloxy, nitro or halogen, i.e., fluorine, chlorine, bromine or iodine.

It is also within the scope of this invention to employ as the dyestuff a compound having the general formula set forth above but wherein there is a plurality of azo groups as, for instance, where, in the structure A—N=N—B—, A represents a radical of the formula A'—N=N—B—, A' having the definition for A previously given and B being defined as before, etc.

It is also within the scope of this invention to employ as the dyestuff a compound of the general formula set forth above, containing one or more metals, such as copper, nickel, chromium or iron, in complex with a chelate system such as an o-hydroxy carboxylic acid or an o:o'-dihydroxy azo system.

In the above formula, R may represent hydrogen, or an alkyl, cycloalkyl or aralkyl group as where the cyanuryl group is bonded to a secondary amine. Preferably, R will represent hydrogen or a lower alkyl group such as methyl, ethyl, hydroxyethyl, propyl, butyl, amyl, hexyl, etc.

In the symmetrical triazino radical, X may be either of the halogens, chlorine and bromine. Y may also be one of said halogens, such as would be the case where the dyestuff was prepared from a cyanuryl halide. It is also within the scope of the invention to employ dyestuffs wherein Y represents an organic radical, as for instance aryl, aryloxy, arylthio, alkyl, alkoxy, alkylthio, amino, alkylamino, dialkylamino, arylamino, aralkylamino, cycloalkylamino, or generally the radical of an azo or polyazo compound as represented above by

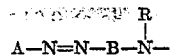

By way of further definition and description of the type of dyestuffs which may be employed in this invention, the following list is presented herewith. It will be understood that this list is not to be deemed as limiting the invention to the specific dyestuffs set forth therein but rather as indicating to one skilled in the art the breadth and general types of materials which may be used. The color of the dyestuff, when applied to the cellulosic materials according to the present process, is also indicated for convenience.

It will be appreciated that the process of this invention is particularly valuable for use with those dyestuffs falling within the class defined hereinbefore which, when dyed from a neutral bath, have a low substantivity on cellulose, since the reaction of the dyestuff with the fibre is never 100% complete, and unreacted dyestuffs of low substantivity can be readily washed out by a scouring process as hereinafter described, especially those dyestuffs which have a lower affinity for cellulose than does Chrysophenine G. The words "substantivity" and "affinity" are used herein with the meanings defined on pages 172 and 102 respectively in "The Physical Chemistry of Dyeing," second edition, by T. Vickerstaff, published in 1954 by Oliver Boyd, London.

TABLE OF DYESTUFFS

| Dyestuff No. | Dyestuff | Shade obtained when applied to cellulosic materials |
|---|---|---|
| 1 | From reaction of equimolecular amounts of cyanuric chloride and the compound obtained by coupling diazotised 2-naphthylamine-4:8-disulphonic acid with o-anisidine. | Yellow. |
| 2 | From reaction of equimolecular amounts of cyanuric chloride and the compound obtained by coupling diazotised 2-naphthylamine-4:8-disulphonic acid with 2:4-dimethoxyaniline. | Orange. |
| 3 | From reaction of equimolecular amounts of cyanuric chloride and the compound obtained by coupling diazotised 2-naphthylamine-4:8-disulphonic acid with o-toluidine. | Yellow. |
| 4 | From reaction of equimolecular amounts of cyanuric chloride and the compound obtained by coupling diazotised 2-naphthylamine-6:8-disulphonic acid with m-toluidine. | Reddish yellow. |
| 5 | From reaction of equimolecular amounts of cyanuric chloride and the compound obtained by coupling diazotised 2-naphthylamine-4:8-disulphonic acid with cresidine. | Do. |
| 6 | From reaction of equimolecular amounts of cyanuric chloride and the compound obtained by coupling diazotised 2-naphthylamine-6:8-disulphonic acid with cresidine. | Very Reddish Yellow. |
| 7 | Product from reaction of one molar proportion of the compound obtained by coupling diazotised 2-naphthylamine-4:8-disulphonic acid with N-ethyl-m-toluidine and cyanuric chloride using the latter in excess. | Reddish Yellow. |
| 8 | Product from reaction of one molar proportion of the compound obtained by coupling diazotised 2-naphthylamine-4:8-disulphonic acid with N-ethyl-cresidine and cyanuric chloride using excess of the latter. | Do. |
| 9 | Product from coupling diazotised anthranilic acid with N-dichlorocyanuryl-H-acid. | Bluish red. |
| 10 | Product from coupling diazotised sulphanilic acid with N-dichlorocyanuryl-H-acid. | Do. |
| 11 | Product from coupling diazotised p-aminobenzoic acid with N-dichlorocyanuryl-H-acid. | Do. |
| 12 | Product from reaction of equimolecular amounts of cyanuric chloride and the compound obtained by coupling diazotised metanilic acid under alkaline conditions with 1:8-aminonaphthol-3:6-disulphonic acid (coupled in the o-position to the hydroxy group). | Slightly bluer red than that given by dyestuff used in Example 5. |
| 13 | Product from coupling diazotised 4-chloro-5-methyl-2-aminobenzenesulphonic acid with N-dichlorocyanuryl-1:8-aminonaphthol-3:6-disulphonic acid. | Red. |

| Dyestuff No. | Dyestuff | Shade obtained when applied to cellulosic materials |
|---|---|---|
| 14 | Product from coupling diazotised 4-aminotoluene-3-sulphonic acid with N-dichlorocyanuryl-1:8-aminonaphthol-3:6-disulphonic acid. | Bluish red. |
| 15 | Product from coupling diazotised 5-chloro-4-methyl-2-aminobenzene-sulphonic acid with N-dichloro-cyanuryl-1:8-aminonapthol-3:6-disulphonic acid. | Do. |
| 16 | Product from coupling diazotised 4-dichloroaniline-2-sulphonic acid with N-dichlorocyanuryl-1:8-amino-naphthol-3:6-disulphonic acid. | Red. |
| 17 | Product from coupling diazotised aniline-2:5-disulphonic acid with N-dichlorocyanuryl-1:8-aminonaphthol-3:6-disulphonic acid. | Very yellowish red. |
| 18 | Product from coupling diazotised 3-aminobenzotrifluoride-4-sulphonic acid with N-dichlorocyanuryl-1:8-aminonaphthol-3:6-disulphonic acid. | Do. |
| 19 | Product from coupling diazotised 3:4-dichloroaniline-6-sulphonic acid with N-dichlorocyanuryl-1:8-aminonaphthol-3:6-disulphonic acid. | Bluish Red. |
| 20 | Product from coupling diazotised 3-aminoanisole-4-sulphonic acid with N-dichlorocyanuryl-1:8-aminonaphthol-3:6-disulphonic acid. | Red. |
| 21 | Product from coupling diazotised 2-aminodiphenylether-4-sulphonic acid with N-dichlorocyanuryl-1:8-amino-naphthol-3:6-disulphonic acid. | Red violet. |
| 22 | Product from coupling diazotised 2-amino-2'-methyldiphenyl ether-4-sulphonic acid with N-dichloro-cyanuryl-1:8-aminonaphthol-3:6-disulphonic acid. | Do. |
| 23 | Product from coupling diazotised metanilic acid with N-dichloro-cyanuryl-2-amino-5-naphthol-7-sulphonic acid. | Orange. |
| 24 | Product from coupling diazotised sulphanilic acid with N-dichloro-cyanuryl-2-amino-5-naphthol-7-sulphonic acid. | Reddish orange. |
| 25 | Product from reaction of equimolecular amounts of cyanuric chloride and the compound obtained by coupling diazotised 4-aminotoluene-3-sulphonic acid under alkaline conditions with 2-amino-5-naphthol-7-sulphonic acid (coupled in o-position to the hydroxy group). | Bright reddish orange. |
| 26 | Product from reaction of equimolecular amounts of cyanuric chloride and the compound obtained by coupling diazotised 4-chloroaniline-2-sulphonic acid under alkaline conditions with 2-amino-5-napthtol-7-sulphonic acid (coupled in the o-position to the hydroxy group). | Orange. |
| 27 | Product from reaction of equimolecular amounts of cyanuric chloride and the compound obtained by coupling diazotised orthanilic acid under alkaline conditions with 2-methylamino-5-naphthol-7-sulphonic acid (coupled in o-position to the hydroxy group. | Scarlet. |
| 28 | Product from reaction of equimolecular amounts of cyanuric chloride and the compound obtained by coupling diazotised 5-chloro-4-methyl-2-amino-benzene sulphonic acid under alkaline conditions with 2-amino-5-naphthol-7-sulphonic acid (coupled in o-position to the hydroxy group). | Orange. |
| 29 | Product from reaction of equimolecular amounts of cyanuric chloride and the compound obtained by coupling diazotised 4-chloro-5-methyl-2-aminobenzene sulphonic acid under alkaline conditions with 2-amino-5-naphthol-7-sulphonic acid (coupled in o-position to the hydroxy group). | Do. |
| 30 | Product from reaction of equimolecular amounts of cyanuric chloride and the compound obtained by coupling diazotised 3-amino-anisole-4-sulphonic acid under alkaline conditions with 2-amino-5-naphthol-7-sulphonic acid (coupled in o-position to the hydroxy group). | Yellowish orange. |
| 31 | Product from reaction of equimolecular amounts of cyanuric chloride and the compound obtained by coupling diazotised 2-amino-toluene-4-sulphonic acid under alkaline conditions with 2-amino-5-naphthol-7-sulphonic acid (coupled in o-position to the hydroxy group). | Orange. |
| 32 | Product from reaction of equimolecular amounts of cyanuric chloride and the compound obtained by coupling diazotised 3-aminotoluene-4-sulphonic acid under alkaline conditions with 2-amino-5-naphthol-7-sulphonic acid (coupled in o-position to the hydroxy group). | Yellowish orange. |
| 33 | Product obtained by coupling diazotised aniline under alkaline conditions with 2-amino-5-naphthol-7-sulphonic acid and diazotising the monoazo compound obtained and coupling with 2-(4':6'-dichloro-s-triazin-2'-ylamino)-5-naphthol-7-sulphonic acid. | Bluish red. |
| 34 | Tetrazotised benzidine is coupled with one molecular proportion of m-phenylene diamine and with one molecular proportion of the monoazo dyestuff obtained by coupling diazotised aniline with H-acid under acid conditions and the tris-azo dyestuff obtained is condensed with one molecular proportion of cyanuric chloride. | Grey. |
| 35 | The monoazo compound obtained by coupling diazotised aniline under alkaline conditions with 2-amino-5-naphthol-7-sulphonic acid is diazotised and coupled with the coupling component used for dyestuff No. 13. | Dull red. |
| 36 | The copper complex of the bis-azo dyestuff obtained by coupling tetrazotised di-anisidine under alkaline conditions with equimolecular proportions of 2-amino-3-naphthol-6-sulphonic acid and 1-amino-8-naphthol-3:6-disulphonic acid is condensed with one molecular proportion of cyanuric chloride. | Blue. |
| 37 | Product obtained by coupling diazotised 2-amino-1-phenol-4-sulphonic acid under alkaline conditions with 2-amino-5-naphthol-7-sulphonic acid forming the copper complex of the azo compound and condensing with one molecular proportion of cyanuric chloride. | Bluish red. |
| 38 | Diazotised 4-nitro-4'-aminostilbene-2:2'-disulphonic acid is coupled with phenol and the product is methylated. The nitro group is reduced to amino and the amino compound obtained is condensed with one molecular proportion of cyanuric chloride. | Yellow. |
| 39 | Diazotised 4-nitro-4'-aminostilbene-2:2'-disulphonic acid is coupled with 1-naphthol-3:6:8-trisulphonic acid. The nitro group is reduced to amino and the monoazo dyestuff obtained is condensed with one molecular proportion of cyanuric chloride. | Red. |
| 40 | Diazotised 5-oxalylamino-2-sulpho-aniline is coupled with 1-naphthylamine-7-sulphonic acid. The monoazo compound is diazotised and coupled with 1-phenylaminonaphthalene-8-sulphonic acid. The oxalyl group is hydrolysed off and the amino-bis-azo compound is condensed with one molecular proportion of cyanuric chloride. | Dark blue. |
| 41 | p-aminoacetanilide is diazotised and coupled with 1-naphthylamine-6-sulphonic acid. The product is diazotised and coupled with 1-naphthylamine-6-sulphonic acid. The product is diazotised and coupled with 2-naphthol-6-sulphonic acid and hydrolysed and the amino-trisazo dyestuff is condensed with one molecular proportion of cyanuric chloride. | Blue-grey. |
| 42 | Diazotised 4-aminoazobenzene-2:2'-disulphonic acid is coupled with m-toluidine and the product is condensed with one molecular proportion of cyanuric chloride. | Yellow-brown. |
| 43 | 4-nitro-4'-aminostilbene-2:2'-disulphonic acid is diazotised and coupled with 1-naphthylamine-4-sulphonic acid. The product is cyclised to the corresponding 1:2'-naphthatriazine, and the nitro group is reduced to amino. The amino compound is diazotised and coupled with 1-naphthylamine-6-sulphonic acid and the product is condensed with one molecular proportion of cyanuric chloride. | Orange. |
| 44 | Diazotised orthanilic acid is coupled under alkaline conditions with 2-amino-5-naphthol-7-sulphonic acid and the product is condensed with one molecular proportion of cyanuric bromide. | Do. |

| Dyestuff No. | Dyestuff | Shade obtained when applied to cellulosic materials |
|---|---|---|
| 45 | Diazotised orthanilic acid is coupled under alkaline conditions with 2-methylamino-5-napthol-7-sulphonic acid and the product is condensed with one molecular proportion of cyanuric bromide. | Orange. |
| 46 | Diazotised p-aminoacetanilide is coupled with 1-(2':5'-dichloro-4'-sulphophenyl)-3-methyl-5-pyrazolone. The product is hydrolysed and condensed with one molecular proportion of cyanuric bromide. | Yellow. |
| 47 | Diazotised orthanilic acid is coupled with 1-(4':6'-dibromo-s-triazin-2-ylamino)-8-naphthol-3:6-disulphonic acid. | Red. |
| 48 | Dyestuff No. 46 is condensed with one molecular proportion of aniline. | Yellow. |
| 49 | Diazotised orthanilic acid is coupled with 1(4':6'-dichloro-s-triazino-2-ylamino)-8-naphthol-3:6-disulphonic acid. | Yellowish-red. |
| 50 | Dyestuff No. 49 is condensed with one molecular proportion of aniline. | Red. |
| 51 | Dyestuff No. 49 is condesned with one molecular proportion of ammonia. | Do. |
| 52 | Diazotised 2-naphthylamine-4:8-disulphonic acid is coupled with m-toluidine and the product is condensed with one molecular proportion of cyanuric chloride. | Reddish Yellow. |
| 53 | Dyestuff No. 52 is condensed with one molecular proportion of the aminostilbene-naphthatriazine used as intermediate in Dyestuff No. 43. | Yellow. |
| 54 | Dyestuff No. 52 is condensed with one molecular proportion of 2-(m-aminobenzoylamino)-5-naphthol-7-sulphonic acid. | Do. |
| 55 | Diazotised 5-nitro-2-sulphoaniline is coupled with cresidine. The product is diazotised and coupled with the coupling component used in Dyestuff No. 13 and the product is condensed with one molecular proportion of p-aminoacetanilide. | Bluish-green. |
| 56 | Two molecular proportions of the product formed by coupling diazotised orthanilic acid with 1-acetylamino-8-naphthol-3:6-disulphonic acid followed by hydrolytic removal of the acetyl group, are condensed with one molecular proportion of cyanuric chloride. | Pink. |
| 57 | The copper complex of Dyestuff No. 55. | Blue. |
| 58 | 1:3-phenylenediamine-4-sulphonic acid is condensed with one molecular proportion of 2-methoxy-4:6-dichlorotriazine and the product is diazotised and coupled with 1-(2':5'-dichloro-4'-sulphophenyl)-3-methylpyrazolone. | Yellow. |
| 59 | 1:3-phenylenediamine-4-sulphonic acid is condensed with one molecular proportion of 2-phenoxy-4:6-dichlorotriazine and the product is diazotised and coupled with 1-(4'-sulphophenyl)-3-carboxy-5-pyrazolone. | Do. |
| 60 | The diazotised product formed by condensating 1:3-phenylene-4-sulphonic acid with one molecular proportion of 2-methoxy-4:6-dichlorotriazine is coupled with 1-(4'-sulphophenyl)-3-carboxy-5-pyrazolone. | Do. |

As discussed hereinbefore, the process of this invention comprises applying the azo-triazino-halide dyestuff to the cellulose textile material and subjecting it to the action of an acid-burning agent after the treatment with the dyestuff.

As acid-binding agents, this invention contemplates substances having a pH in decinormal aqueous solution of at least 8.5, and also substances having low solubility which give saturated aqueous solutions having a pH of this or higher value, for example inorganic and organic bases such as sodium hydroxide, potassium hydroxide, hydrated magnesium oxide and triethanolamine etc., and also the salts of weak inorganic acids such as sodium carbonate, tripotassium phosphate, sodium silicate, triethanolamine carbonate and sodium borate. These materials will characteristically be used directly as the acid-binding agent. Alternatively, this invention may be practised by impregnating the goods with the dyestuff and with a reagent which will release such an acid-binding agent upon being subjected to an elevated temperature. These latter reagents include such materials as alkali metal bicarbonates as well as materials such as sodium trichloroacetate.

When the invention is practiced as a dyeing process, the cellulosic material may be padded with an aqueous solution of the dyestuff. In general, this process can be carried out conveniently in the cold, that is at a temperature from about 10° C. to about 30° C. but this range is not restrictive. With tightly woven textiles and other fibres which are in a form which is difficult to penetrate with aqueous solutions, a slightly higher temperature, for example about 50° C., is superior. The concentration of the aqueous solution of the dyestuff may be from about 0.01% to about 15% or even higher, if the solubility of the dyestuff will permit. The padding process will be carried out to a point such that the fabric has picked up from 50% to 200% or more of its weight of the solution, depending on the ratio of weight of dyestuff, relative to the weight of the fabric, which is desired.

After padding, the material may be dried at a temperature of from about 40° C. to about 60° C. On the other hand, the drying stage may be omitted, especially in the case of continuous processes, or may be carried out, in the latter event, at elevated temperature, of, for example, from about 70° C. to about 170° C.

The material may then be impregnated with an aqueous solution of the acid-binding agent and preferably the material is then subsequently subjected to an elevated temperature, e.g. by steaming at a temperature of from about 95° C. to about 102° C. The solution of the acid-binding agent used in this modification of the process may have a concentration of from about 0.05% to 20% or more, preferably between 1% and 3%, and may conveniently be employed at a temperature from room temperature to that of the boiling solution. The steam may be generated in situ by subjecting the moist material to a source of dry heat, such as an oven, a stenter, a molten metal bath or the outer surface of heated cylinders.

The impregnated textile material may be immersed in the acid-binding agent solution for a period of time which will vary with the conditions and the dyestuff but ordinarily will not require more than a few minutes. Generally speaking, when caustic alkali is used at a temperature lower than 100° C., or no matter what the acid-binding agent, if the material is subsequently heated or steamed one minute will suffice. If a non-caustic alkali is used, and there is to be no subsequent heating or steaming step, then a longer treatment is desirable and the duration of this may be from 5 minutes to 1 hour depending on the temperature of the solution of acid-binding agent.

After treatment in the solution of the acid-binding agent the textile material should be rinsed. Preferably it is then treated with a dilute solution of a weak acid in order to neutralize any residual alkaline agent. For best results, the material is then again rinsed and dried. The solution of the weak acid may have a concentration of from about 0.01 N. to 2 N., and the acidic component may comprise a weak inorganic acid or acid salt, such as sodium bisulphate or sodium bicarbonate, or a weak organic acid, for example acetic acid, or propionic acid. The choice of the actual acid used is not critical in the practice of this invention, only the function thereof being significant in neutralizing the cloth.

In that embodiment of the invention where the material is to be treated with a substance which liberates an acid-binding agent on heating or steaming, this may be done either before, or after impregnation with the dyestuff but preferably the substance is added to the dyestuff solution. After the textile material has been impregnated with the dyestuff and the substance noted above, it is then subjected to the action of elevated temperatures to liberate the alkali acid-binding agent. It will be appreciated that only at this point is the desired alkalinity introduced into the material.

Thereafter, the material may be rinsed and dried, as described above, and, if desired, treated with weak acidic solution, as noted above.

Advantageously, the aqueous solution of the acid-binding agent may contain additional substances for instance inorganic salts of alkali metals for example sodium sulfate and sodium chloride, and it is preferred to use as the acid-binding agent a solution of caustic alkali which contains a high concentration of sodium chloride in solution.

The aqueous impregnating solution may also contain the usual dyebath additive customarily employed. These include in particular, urea, wetting agents such as heavy sulfonated oils and water-soluble alkylethers of cellulose, and migration inhibitors such as sodium alginate.

Prior to finally drying the fabric, a scouring treatment in for example a hot aqueous solution of soap or any detergent and sodium carbonate may be employed. It has been found that this treatment increases the fastness to washing or subsequent wet processing of the dyed materials produced by this invention by removal of unreacted dyestuff. Such a scouring treatment is rarely used with commercial water-soluble dyestuffs i.e. "direct" dyestuffs for cellulose textile materials, since it will usually wash such dyestuffs out of the fabric. This difference further points out the novelty of the present invention.

When in the practice of this invention there is employed a dyestuff which contains hydroxy or carboxy groups ortho to the azo group, metal complexes may be formed. For example, nickel, cobalt, chromium, and especially copper will complex with the dyestuffs noted above in subjecting the dyed material to a further treatment with inorganic salts of such metals will yield dyed materials having a still increased fastness to light and to washing.

As previously mentioned, this invention also encompasses techniques for printing cellulose textile materials. The process for dyeing cellulose textile materials may be simply modified by locally printing with a printing paste containing the dyestuff instead of impregnating the whole of the textile with an aqueous solution of the dyestuff, and thereafter subjecting the textile to a solution of an acid-binding agent as indicated above. A valuable modification of this printing process comprises applying a printing paste specially prepared to the material and thereafter heating or steaming the so-treated textile thus eliminating the separate treatment with an acid-binding agent.

The printing paste used herein contains a dyestuff as set forth hereinabove and an acid-binding agent or a reagent which will release an acid-binding agent on heating or steaming. Here, again, the acid-binding agents include non-caustic alkalis and preferably salts of weak inorganic acids. The reagents which suitably release an acid-binding agent include alkali metal bicarbonates and materials such as sodium trichloroacetate.

Conventional adjuvants may also be present in the printing paste such as urea and thickening agents such as methyl cellulose, starch and locust bean gum. It is preferred however to use as the thickening agent, an agent free from primary alcoholic hydroxyl groups, and in particular, an alginate for example sodium alginate.

Generally speaking, the processes described herein apply to the entire class of dyestuffs set forth hereinabove. There are preferred modifications, as will be indicated in the subsequent examples, which are particularly advantageous with specific types of the dyestuffs. We have also observed that when the textile material is not dried after the dyestuff impregnation, then (a) when a dihalogeno-triazine dyestuff is used it is advantageous to employ a cold aftertreatment with alkali, and (b) when a monohalogeno-triazine dyestuff is used it is advantageous to employ a hot aftertreatment (i.e., at 50° C. or above), for best results.

A further preferred embodiment of the invention lies in the use of buffered compositions.

Conveniently, the dyestuff can be admixed with the buffering substance or substances in the preparation of the dyestuff itself, and this provides a desirable mixture for use in the present process. Particularly suitable buffers include mixtures of disodium or dipotassium hydrogen phosphate with monosodium or monopotassium dihydrogen phosphate. The mixtures which are preferred are those which will maintain the coloring medium at a pH within the range of from 6 to 8, preferably from 6 to 7. A mixture having these characteristics is, for example, that formed of seven parts of anhydrous disodium hydrogen phosphate and 12.5 parts of anhydrous potassium dihydrogen phosphate. Another suitable mixture is that formed from one part of anhydrous disodium hydrogen phosphate and two parts of anhydrous potassium dihydrogen phosphate. As illustrated in, for instance, Example 5 hereinafter, the buffer mixture may be introduced during the preparation of the dyestuff as well as being admixed with the resulting solid product therefrom.

By way of illustrating the above features of the invention and the various embodiments thereof, the following examples are provided but it will be appreciated that the invention is not limited to the specific embodiments set forth therein. In these examples, the "parts" given are by weight.

Example 1

100 parts of cotton limbric are padded with a cold 4% aqueous solution of the dyestuff, prepared as described below, containing 0.2% of a highly sulphonated oil and squeezed until its total weight is between 2 and 2.25 times the weight of the original limbric, and then dried at 40° C. The material is then immersed for one minute at 95° C. in a 6% aqueous solution of sodium hydroxide saturated with sodium chloride. The cotton limbric is then removed, rinsed thoroughly with hot water and then immersed in a cold 0.2% solution of acetic acid and again rinsed in hot water. It is then scoured for two minutes in a boiling aqueous solution containing 2% of soap and 5% of anhydrous sodium carbonate, again rinsed in hot water and then dried. The cotton limbric is thereby colored to a deep red shade possessing very good fastness to washing.

The dyestuff used in the process of the above example may be obtained as follows:

27.7 parts of 4-aminoazobenzene-4'-sulphonic acid are diazotised and an aqueous suspension of the diazo compound thus obtained is added at 5° to 10° C. to a stirred aqueous solution at 0° to 5° C. containing 38.7 parts (calculated as the free acid) of the primary condensation product, obtained from one molecular proportion of cyanuric chloride and one molecular proportion of the sodium salt of 2-amino-5-naphthol-7-sulphonic acid, in 1,400 parts of water. 56 parts of sodium acetate crystals are then added gradually during 10 to 15 minutes and stirring is continued at 0° to 5° C. for 16 hours, after which time sufficient 10% aqueous sodium carbonate solution is added to render the mixture neutral to litmus. The mixture is stirred for 1 hour more, and sufficient common salt to give a solution containing 150 grams salt per litre of solution is added. The suspension is filtered and the solid is washed, first with 15% aqueous sodium chloride solution and then with acetone, and finally dried at room temperature. Analysis of the product thus obtained shows the presence of 1.93 atoms of organically bound chlorine per molecule of the diazo dyestuff.

Example 2

100 parts of cotton limbric are padded with a cold 2% aqueous solution of the dyestuff prepared as described below, containing 0.2% of a highly sulphonated oil, and squeezed until it weighs 215 parts and then dried at 40° C. The material is then immersed for one minute at 90 to 95° C. in a 3% aqueous solution of caustic soda containing 20% sodium chloride. The limbric is then removed from the solution and rinsed, treated with dilute acetic acid, rinsed, scoured, rinsed and dried as in Example 1. It is thus colored a bright reddish-yellow shade, possessing very good fastness to washing, to soda boil and to light.

The dyestuff used in the process of the above example may be obtained as follows:

18.5 parts of cyanuric chloride are dissolved in 100 parts of dry acetone and the solution is added gradually with stirring to a mixture of 400 parts of water and 450 parts of crushed ice. To the stirred suspension of cyanuric chloride thus obtained there is added during 30 to 40 minutes a solution in 800 parts of water at 10 to 15° C. of 46.5 parts of the disodium salt of the monoazo compound obtained by coupling diazotized 2-naphthylamine-4:8-disulphonic acid with m-toluidine. Stirring is continued for 15 to 30 minutes while the temperature of the mixture is kept below 5° C. after which sufficient 2 N sodium carbonate solution to render the mixture neutral to litmus is added gradually. To the mixture is then added sufficient sodium chloride to give a solution containing 150 grams of salt per litre of solution and when this has dissolved, the whole is filtered and the solid residue is washed first with 10% aqueous sodium chloride and then with acetone, and finally dried at room temperature. Analysis of the dyestuff shows the presence of 1.97 atoms of organically bound chlorine per molecule of the monoazo dystuff.

Example 3

100 parts of cotton limbric are padded with a cold 1.7% aqueous solution of the dyestuff obtained as described below and squeezed until it weighs 233 parts. The cotton thus treated is dried at 40° C. and is then immersed for two minutes at 25° C. in a 10% aqueous solution of caustic soda saturated with sodium chloride. The limbric is then removed and further treated as described in Example 1. By this process it is colored a bright orange shade possessing very high fastness to washing and light.

The dyestuff used in the process of the above example may be obtained as follows:

17.3 parts of o-aminobenzene sulphonic acid are diazotised in known manner and an aqueous suspension of the diazonium compound thus obtained is added at 0 to 2° C. to a stirred solution at 0° to 5° C. containing 38.7 parts (calculated as the free acid) of the primary condensation product, obtained from one molecular proportion of cyanuric chloride and one molecular proportion of the sodium salt of 2-amino-5-naphthol-7-sulphonic acid, in 1,400 parts of water. 56 parts of sodium acetate crystals are then added gradually during 10–15 minutes, and stirring is continued at 0° to 5° C. for 1 hour after which sufficient 10% aqueous sodium carbonate solution is added to render the mixture faintly alkaline to litmus. The mixture is stirred at 0° C. for a further hour after which sufficient sodium chloride is added to give a solution containing 200 grams of salt per litre of solution, and when this has dissolved, the whole is filtered and the solid residue is washed, first with 20% sodium chloride solution and then with acetone, and dried in air at ordinary temperature.

The dyestuff used in the process of the above example may also be obtained as follows:

A solution of 18.5 parts of cyanuric chloride in 100 parts of dry acetone is added gradually, with stirring, to a mixture of 300 parts of water and 400 parts of crushed ice. To the stirred suspension of cyanuric chloride so obtained there is added during 40 minutes a solution in 800 parts of water at 20° C. of 46.7 parts of the disodium salt of the aminoazo compound formed by coupling diazotised 2-aminobenzene sulphonic acid with 2-acetylamino-5-naphthol-7-sulphonic acid in the presence of sodium carbonate and after purifying the product to remove from it any dyestuff formed by coupling on the 8-position of the J-acid, hydrolyzing to remove the acetyl group by heating it in an aqueous solution containing about 4% caustic soda at 80–85° C.

The temperature of the reaction mixture is maintained between 0° and 4° C. and within a few minutes of completing the addition of aminoazo compound none of it remains unchanged. The acid solution formed is made neutral to litmus by the addition of sodium carbonate solution and there is also added to it a solution containing 7 parts of anhydrous disodium hydrogen phosphate and 12.5 parts of anhydrous potassium dihydrogen phosphate in 100 parts of water and sufficient salt to give a strength of 10% NaCl w./v. The desired dyestuff is thereby precipitated and after stirring the suspension for a short time is filtered off and dried at 20–30° C. after mixing the filter cake intimately with 4.2 parts of anhydrous disodium phosphate and 7.5 parts of anhydrous potassium dihydrogen phosphate.

Example 4

100 parts of cotton limbric are padded with a cold 2% aqueous solution of the dyestuff obtained as described below containing 0.2% of a highly sulphonated oil and squeezed until its total weight is 2 to 2.5 times the weight of the original limbric and then dried at 40° C. It is then treated with a 6% aqueous solution of sodium hydroxide saturated with sodium chloride in the manner described in Example 1, followed by rinsing and drying as also described in Example 1. An orange coloration of good fastness to light and very good fastness to washing is thereby obtained. The limbric thus dyed is immersed for 15 to 20 minutes at 60° C. in a solution containing 2 parts of copper sulphate crystals and 1 part of glacial acetic acid in 3,000 parts of water, and is then thoroughly rinsed in hot water and dried. The cotton limbric is thereby colored to a brick-red shade, possessing very good fastness to washing and light.

The dyestuff used in the process of the above example may be obtained as follows:

A solution of 18.5 parts of cyanuric chloride in 100 parts of dry acetone is added gradually with stirring to a mixture of 400 parts of water and 400 parts of crushed ice. To this suspension a solution containing 43.1 parts of the disodium salt of the monoazo compound obtained by coupling in alkaline medium diazotised anthranilic acid with 2-amino-5-naphthol-7-sulphonic acid in 1,000 parts of water at 25° C. is then added during 45 minutes and the reaction mixture is stirred at a temperature below 5° C. for a further hour after the addition is complete. 53 parts of a 10% aqueous solution of sodium carbonate are then added gradually during 10–15 minutes and stirring is continued for 20 minutes after which time sufficient sodium chloride to give a solution containing 100 grams of salt per litre of solution is added. Stirring is continued for 30 minutes and then the mixture is filtered and the solid residue is washed first with 10% brine and then with acetone, and dried at atmospheric temperature.

Example 5

100 parts of cotton limbric are padded with a cold 2% aqueous solution of the dyestuff obtained as described below, containing 0.5% of a highly sulphonated oil, and squeezed until it weighs 185 parts, and is then dried at 40° C. The material is then immersed for 1 minute at 95° C. in a 3% aqueous solution of sodium hydroxide saturated with sodium chloride. The material is then removed rinsed thoroughly with hot water, and then immersed in a cold 0.2% solution of acetic acid and again rinsed in hot water. It is then scoured for two minutes in a boiling aqueous solution containing 2% of soap and 5% of anhydrous sodium carbonate, again rinsed and then dried. The cotton limbric is thereby coloured to a yellowish red shade, possessing excellent fastness to washing.

The dyestuff used in this example may be prepared as follows:

A solution of 18.5 parts of cyanuric chloride in 100 parts of acetone is poured into a stirred mixture of 300 parts of water and 300 parts of crushed ice, and 2 parts of 2 N hydrochloric acid are added. To the suspension of cyanuric chloride thus obtained there is added during 1 hour a solution containing 36.3 parts of disodium salt of 1-amino-8-naphthol-3:6-disulphonic acid in 160 parts of water and which has been made faintly alkaline to Brilliant Yellow by the addition of aqueous sodium carbonate solution. The temperature of the mixture during and subsequent to the addition is kept below 5° C. The reaction mixture is stirred until no unchanged 1-amino-8-naphthol-3:6-disulphonic acid remains in the resulting solution. To this mixture is added at 0° C. to 5° C. during 5 minutes a dispersion of the diazo compound obtained by diazotizing 16.45 parts of aniline-2-sulphonic acid at 0° C. to 2° C. 50 parts of sodium acetate crystals are then added during 10 minutes to the mixture, which is then stirred at 0° C. to 4° C. for 20 hours, and then rendered slightly alkaline to litmus by the addition of anhydrous sodium carbonate. Sufficient sodium chloride to give a solution containing 200 grams of salt per litre of solution is then added, the mixture is stirred for 30 minutes and then filtered. The residual solid is then washed with 20% aqueous sodium chloride solution and dried at 20–45° C. The product forms a bluish red powder which dissolves in water to give a yellowish red solution and in concentrated sulphuric acid to give a reddish violet solution. An alternative method for the preparation of the dyestuff used in this example is as follows:

A solution of 18.6 parts of cyanuric chloride in 100 parts of acetone is poured into a stirred mixture of 300 parts of water and 300 parts of crushed ice. There is added during 40 minutes to the suspension so formed, a solution of 56.9 parts of the trisodium salt of the aminoazo compound, formed by coupling diazotised orthanilic acid with 1-acetylamino-8-naphthol-3:6-disulphonic acid in the presence of sodium carbonate and hydrolyzing the product in aqueous solution by means of caustic soda. The mixture is stirred at a temperature between 0° and 5° C. for 30 minutes and then sodium carbonate solution is added gradually until the solution formed reacts alkaline to litmus paper. Sufficient sodium chloride to give a solution containing 200 grams of salt per litre of solution followed by an aqueous solution containing 7 parts of anhydrous disodium hydrogen phosphate and 12.5 parts of anhydrous potassium dihydrogen phosphate. The mixture is stirred for 2 hours, and then filtered, and the resultant solid is mixed intimately with 4 parts of anhydrous disodium hydrogen phosphate and 7.2 parts of anhydrous potassium dihydrogen phosphate and dried at 40° C.

*Example 6*

100 parts of cotton limbric are padded with a cold 1% aqueous solution of the dyestuff used in Example 2, containing 0.5% of a highly sulphonated oil, and the limbric is squeezed until it weighs 190 parts and then dried at 40° C. The material is then padded through a cold 2% aqueous solution of anhydrous sodium carbonate containing 35% sodium chloride, and then dried at 40° C. The material is then steamed for 2 minutes, rinsed with hot water and then immersed in a cold 1% solution of sodium bicarbonate and again rinsed in hot water. It is then scoured for 2 minutes in a boiling aqueous solution containing 2% of soap and 5% of anhydrous sodium carbonate, again rinsed with hot water and dried. The cotton limbric is thereby colored to a bright yellow shade possessing good fastness to washing, to soda boiling and to light.

*Example 7*

100 parts of cotton limbric are padded with a cold 1% aqueous solution of the dyestuff used in Example 2, containing 0.5% of a highly sulphonated oil and the limbric is squeezed until it weighs 190 parts and then dried at 40° C. The material is then immersed for 1 minute at 90 to 95° C. in a 3% aqueous solution of anhydrous sodium carbonate containing 35% of sodium chloride. The limbric is then removed from the solution and rinsed, treated with dilute acetic acid, rinsed, scoured, rinsed and dried as described in Example 1. It is thus colored to a bright yellow shade of good fastness to washing and to light.

*Example 8*

100 parts of cotton limbric are padded with a cold 1% aqueous solution of the dyestuff used in Example 2, containing 0.5% of a highly sulphonated oil and the limbric is then squeezed until it weighs 190 parts and then dried at 40 C. The material is then padded through a cold aqueous 3% solution of sodium bicarbonate containing 30% sodium chloride and dried at 40° C. It is then steamed for 2 minutes, and washed thoroughly with hot water. The material is then scoured and rinsed as described in Example 5. It is then colored to a bright yellow shade of good fastness to washing and to light.

*Example 9*

100 parts of cotton limbric are padded with a cold 1% aqueous solution of the dyestuff used in Example 2 containing 0.5% of a highly sulphonated oil and 8% of sodium trichloroacetate and the limbric is then squeezed until it weighs 190 parts and then dried at 40° C. It is then steamed for 3 minutes, rinsed with hot water, followed by a rinse with a cold 1% solution of sodium bicarbonate and a further rinse with hot water. The material is then scoured and rinsed as described in Example 5. It is thereby colored to a bright yellow shade of good fastness to washing, soda boiling and light.

*Example 10*

A printing paste is made up from the following composition:

| | Parts |
|---|---|
| Dyestuff of Example 2 | 0.5 |
| Urea | 0.5 |
| Water | 38.9 |
| Sodium bicarbonate | 0.1 |
| Sodium alginate (4% aqueous solution) | 60 |
| | 100 |

This paste is applied to mercurized cotton fabric on a roller printing machine. The fabric is dried and steamed for 10 minutes. The print is then washed in cold water, and soaped for 10 minutes at 100° C. in a solution containing 2 parts of soap per 1,000 parts of water, rinsed and dried. The bright reddish-yellow print so obtained possesses very good fastness to washing, to soda boil and to light.

*Example 11*

A printing paste is made up from the following composition:

| | Parts |
|---|---|
| Dyestuff of Example 2 | 5 |
| Urea | 5 |
| Water | 29 |
| Sodium bicarbonate | 1 |
| Sodium alginate (4% solution) | 60 |
| | 100 |

The composition is applied to cotton fabric on a roller printing machine. The fabric is then dried, and steamed for 10 minutes. The print is then washed in cold water, and soaped for 10 minutes at 100° C. in a solution containing 2 parts of soap per 1,000 parts of water, rinsed and dried. The bright reddish-yellow print so obtained possesses very good fastness to washing, to soda boil, and to light.

Example 12

A printing paste is made up from the following composition:

| | Parts |
|---|---|
| Dyestuff of Example 2 | 2 |
| Urea | 5 |
| Water | 33 |
| Sodium alginate (4% aqueous solution) | 60 |
| | 100 |

The composition is applied to cotton fabric on a roller printing machine. The fabric is dried, steamed for 10 minutes, and padded through an aqueous solution at 90° C. containing 6% of sodium hydroxide and saturated with sodium chloride. The print is then washed in cold water, and soaped at 100° C. for 10 minutes in a solution containing 2 parts of soap per 1,000 parts of water, rinsed and dried.

The resultant bright reddish-yellow print possesses very good fastness to washing, to soda boil and to light.

Example 13

100 parts of cotton limbric are padded with a cold 4% aqueous solution of the dyestuff used in Example 5 containing 0.2% of a highly sulphonated oil and the limbric is then squeezed until its total weight is 200 parts and then dried at 40° C. It is then padded with a 1% aqueous solution of sodium hydroxide containing 30% common salt and squeezed until its weight is 200 parts. It is then hung in the air for one minute, rinsed thoroughly with hot water and then immersed for two minutes in a boiling aqueous detergent solution, then again rinsed in hot water and dried.

The cotton limbric is thus dyed to a bright red shade possessing excellent fastness to washing.

Example 14

100 parts of cotton limbric are padded with a cold 1% aqueous solution of the dyestuff used in Example 5, containing 0.2% of a highly sulphonated oil, and squeezed between rollers until its weight is 190 parts. The limbric is then dried at 40° C. and then padded with a cold 2% aqueous solution of anhydrous sodium carbonate containing 35% sodium chloride, squeezed between rollers until its weight is 200 parts, and steamed for 2 minutes at 100° C. It is then rinsed in hot water, immersed for 2 minutes in a boiling aqueous detergent solution, rinsed again and dried.

The cotton limbric is thus dyed to a bright red shade possessing excellent fastness to washing.

Example 15

100 parts of cotton limbric are dyed by the method of Example 13, except that the limbric is steamed for one minute at 100° C. immediately after padding with the caustic soda and salt solution.

The cotton limbric is thus dyed to a bright red shade possessing excellent fastness to washing.

Example 16

100 parts of cotton limbric are padded with a cold 2% aqueous solution of the dyestuff used in Example 5, containing 0.5% of sodium bicarbonate and 0.2% of a highly sulphonated oil, and squeezed between rollers until its weight is 200 parts. The limbric is then steamed for four minutes at 102° C. It is then rinsed with hot water, immersed for two minutes in a boiling detergent solution, rinsed and dried.

The cotton limbric is thus dyed to a bright red shade possessing excellent fastness to washing.

Example 17

100 parts of cotton limbric are padded with a cold aqueous solution containing 2% of the dyestuff used in Example 5, 0.2% of a highly sulphonated oil and 8% of sodium trichloroacetate, and squeezed between rollers until its weight is 200 parts. It is then steamed for 3 minutes at 102° C., rinsed in hot water, immersed for two minutes in a boiling detergent solution, rinsed again and dried.

The cotton limbric is thus dyed to a bright red shade possessing excellent fastness to washing.

Example 18

100 parts of cotton limbric are dyed by the method of Example 1, the caustic soda being replaced by 2.5% of triethanolamine carbonate.

The cotton fabric is dyed to a bright red shade with excellent fastness to washing.

Using this same manipulative technique for Example 18, but replacing the dyestuff of Example 1 by the dyestuffs numbers 40 and 46 in the table presented hereinabove, dyes having blue and yellow shades respectively were obtained. The dyed materials again exhibited excellent fastness to washing.

Example 19

100 parts of cotton limbric are padded with a solution as used in Example 16 and then the limbric is squeezed between rollers until its weight is 200 parts. It is then heated in an oven at 110° C. for 4 minutes. The fabric is then rinsed and scoured as in Example 13. The fabric is thus dyed to a bright red shade possessing excellent wet fastness properties.

The procedure of Example 19 was also carried out with the dyestuffs numbered 38, 47, 43 and 58, which provided yellow, red, orange and yellow shades respectively. Each of the thus dyed materials showed excellent color fastness characteristic under conditions of wet treatments.

Example 20

100 parts of cotton limbric are padded with a cold 2% aqueous solution of the dyestuff used in Example 5 and 0.2% of a highly sulphonated oil, and the limbric is squeezed between rollers until its weight is 200 parts. The padded cloth is then transferred to a jig dyeing machine and treated with 500 parts of a cold liquor containing 15 parts of sodium chloride and 2½ parts of a soda ash for one hour. At the end of this time the cloth is rinsed thoroughly with water, scoured for 5 minutes in a boiling detergent solution, rinsed and dried.

The fabric thus dyed is colored to a bright red shade possessing excellent fastness to wet treatments.

The manipulative procedure of Example 20 has been used with each of the dyestuffs numbered one (1) through 48 inclusive, in the table, and dyes in each case were obtained having the shade indicated in the table, each dyed material possessing excellent fastness of color characteristic to wet treatments.

Example 21

100 parts of spun viscose rayon piece are padded with a 2% aqueous solution of the dyestuff numbered 51 in the table and 0.2% of a highly sulphonated oil and squeezed between rollers until its weight is 200 parts. The cloth is then transferred to a winch dyeing machine and treated with 3000 parts of an aqueous liquor containing 90 parts of common salt and 15 parts of soda ash at 85° C. for one hour. At the end of this time the cloth is rinsed and scoured as described in Example 20.

The cloth is thus dyed to a yellow shade possessing excellent fastness to washing.

In place of dyestuff 51, employed in Example 21, any of the other dyestuffs numbered from 48 to 58 in the table have been employed in the specific process just recited. The shade produced on the cloth was that indicated in the table and the dyed material possessed excellent fastness characteristics when subjected to wet treatment.

Example 22

A printing paste containing:

| | Parts |
|---|---|
| Dyestuff 49 of the table | 1.5 |
| Urea | 3 |
| Water | 59.5 |
| 5% aqueous sodium alginate solution | 35 |
| Sodium carbonate | 1 | is printed by roller on a cotton plain weave fabric. The fabric is dried, steamed for five minutes, rinsed in cold water, and scoured, rinsed and dried as described in Example 20.

The printed portion of the fabric is colored a red shade having excellent fastness to washing and to light.

Example 23

A printing paste containing:

| | Parts |
|---|---|
| Dyestuff used in Example 5 | 3 |
| Urea | 3 |
| Water | 56.8 |
| 5% aqueous sodium alginate solution | 35 |
| Sodium trichloroacetate | 2.2 | is printed by stencil on a spun viscose fabric. The fabric is then dried, steamed for 10 minutes, then rinsed, scoured, rinsed and dried as described in Example 20.

The printed portion of the fabric is colored a red shade having excellent fastness to washing and to light.

Example 24

Example 10 is repeated, but instead of drying and steaming, the mercerized cotton fabric, after application of the printing paste, is heated at a temperature between 100° C. and 105° C. for about 15 seconds by passing the fabric round the surface of steam-heated drying cylinders.

The fabric is coloured a bright reddish-yellow shade where the printing paste has been applied. The shade is very fast to light and to washing.

Example 25

2 parts of the dyestuff obtained as described below are dissolved in 3,000 parts of water at a temperature between 18° C. and 20° C. 100 parts of viscose rayon yarn are added to this solution and then 90 parts of sodium chloride are added. The yarn is agitated in the solution for 30 minutes, then 6 parts of anhydrous sodium carbonate are added. After a further 1 hour the viscose rayon is removed, rinsed in water and scoured for 15 minutes in a boiling 0.3% aqueous neutral detergent solution. It is then rinsed in cold water and dried. The viscose rayon is dyed a bright greenish yellow shade having good fastness to light and to washing.

The dyestuff used in the above example is obtained by coupling diazotised 5-acetylamino-2-sulphoaniline with 1-(2′:5′-dichloro-4-sulphophenyl)-3 - methylpyrazolone; heating the monoazo compound obtained with aqueous hydrochloric acid to hydrolyse the acetylamino group, and condensing the aminoazo compound so obtained with one molecular proportion of cyanuric chloride.

The foregoing specific embodiments have been shown and described for the purpose of illustrating the principles of this invention. It will be apparent to one skilled in the art that extensive changes can be made therein without departure from such principles. Therefore, this invention includes all modifications encompassed within the spirit and scope of the following claims.

We claim:

1. The process for the coloring of cellulose textile materials which comprises impregnating said textile materials in aqueous medium with a dyestuff selected from the group consisting of monoazo and polyazo dyestuffs containing at least one ionogenic solubilizing group and an amino group selected from the group consisting of primary and secondary amino groups carrying as N-substituent a 1:3:5-triazine radical containing a halogen atom attached to a carbon atom of said triazine ring, and thereafter subjecting the impregnated textile materials to the action of an acid-binding agent in aqueous media.

2. The process of claim 1, wherein said acid-binding agent is caustic alkali.

3. The process of claim 1, wherein said acid-binding agent is an alkali metal salt of a weak inorganic acid.

4. The process of claim 1, wherein said aqueous medium also contains a migration inhibitor.

5. The process of claim 1, wherein said dyestuff is placed in said aqueous medium in the form of a stabilized buffered composition.

6. The process of claim 1, wherein said ionogenic solubilizing group in said dyestuff is selected from the group consisting of $-CO_2H$ and $-SO_3H$ groups.

7. The process of claim 1, wherein said dyestuff is obtained by condensing one molecular proportion of an amino-azo compound containing at least one ionogenic solubilizing group with one molecular proportion of cyanuric chloride.

8. The process of claim 1, wherein said cellulose textile material is selected from the group consisting of cotton, linen, and regenerated cellulose.

9. The process of claim 1, wherein said cellulose textile materials are impregnated with a substance which liberates said acid-binding agent in situ by the action of elevated temperature, and wherein said impregnated cellulose textile materials are subjected to said action of said elevated temperature.

10. The process of claim 9, wherein said acid-binding agent is liberated from said substance in situ by steaming at said elevated temperature.

11. The process of claim 10 wherein said substance is an alkali metal bicarbonate.

12. The process of claim 1, wherein said aqueous medium containing said acid-binding agent also contains as an added electrolyte an inorganic salt of an alkali metal.

13. The process of claim 12, wherein said added electrolyte is selected from the group consisting of sodium chloride and sodium sulfate.

14. A process for the printing of cellulose textile materials which comprises applying to said materials a printing paste containing a dyestuff selected from the group consisting of monoazo and polyazo dyestuffs as defined in claim 1, and a substance selected from the group consisting of acid-binding agents and substances which on being subjected to the action of an elevated temperature liberate an acid-binding agent, drying the thus treated textile materials and thereafter subjecting the dried materials to the action of elevated temperatures.

15. The process of claim 14, wherein said treated textile materials are subjected to the action of an elevated temperature by steaming.

16. The process of claim 14, wherein said substance is an alkali metal bicarbonate.

17. The process of claim 14, wherein said printing paste also contains sodium alginate.

18. The process of claim 14, wherein the ionogenic solubilizing group present in said dyestuff is selected from the group consisting of $-CO_2H$ and $-SO_3H$ groups.

19. The process of claim 14, wherein said dyestuff is obtained by condensing one molecular proportion of an amino-azo compound containing at least one ionogenic solubilizing group with one molecular proportion of cyanuric chloride.

20. The process of claim 14, wherein said cellulose textile material is selected from the group consisting of cotton, linen, and regenerated cellulose.

21. A printing paste for use in the process, claimed in claim 14, which contains a dyestuff as defined in claim 1 and a substance which liberates an acid-binding agent when exposed to the action of elevated temperatures.

22. The printing paste of claim 21, wherein said substance is an alkali metal bicarbonate.

23. The process for the dyeing of cellulose textile materials which comprises impregnating said textile materials with an aqueous solution of a dyestuff selected from the group consisting of monoazo and polyazo dyestuffs containing at least one ionogenic solubilizing group and an amino group selected from the group consisting of primary and secondary amino groups carrying as N-substituent a 1:3:5-triazine radical containing a halogen atom attached to a carbon atom of said triazine ring, said aqueous solution also containing a migration inhibitor, thereafter drying the thus impregnated cellulose textile materials, and then subjecting the dried materials to the action of an acid-binding agent.

24. The process of claim 23, wherein said acid-binding agent is an aqueous solution containing as most 20% by weight of caustic alkali.

25. The process for the dyeing of cellulose textile materials which comprises impregnating said textile materials with an aqueous solution of a dyestuff selected from the group consisting of monoazo and polyazo dyestuffs containing at least one ionogenic solubilizing group and an amino group selected from the group consisting of primary and secondary amino groups carrying as N-substituent a 1:3:5-triazine radical containing a halogen atom attached to a carbon atom of said triazine ring, said solution also containing a substance which liberates an acid-binding agent by the action of elevated temperature; and thereafter subjecting the thus impregnated cellulose textile materials to said action of said elevated temperature.

26. The process of claim 25, wherein said solution also contains a migration inhibitor.

27. The process of claim 26, wherein said solution also contains urea.

References Cited in the file of this patent

UNITED STATES PATENTS

| | | |
|---|---|---|
| 1,886,480 | Haller | Nov. 8, 1932 |
| 2,722,527 | Wehrli | Nov. 1, 1955 |

FOREIGN PATENTS

| | | |
|---|---|---|
| 543,301 | Great Britain | Feb. 18, 1942 |